United States Patent
Kim

(10) Patent No.: US 10,998,844 B2
(45) Date of Patent: May 4, 2021

(54) APPARATUS AND METHOD FOR CONTROLLING MULTI-WINDING MOTOR

(71) Applicant: MANDO CORPORATION, Gyeonggi-do (KR)

(72) Inventor: Tae Sik Kim, Daegu (KR)

(73) Assignee: MANDO CORPORATION, Gyeonggi-do (KR)

( * ) Notice: Subject to any disclaimer, the term of this patent is extended or adjusted under 35 U.S.C. 154(b) by 186 days.

(21) Appl. No.: 16/172,712

(22) Filed: Oct. 26, 2018

(65) Prior Publication Data

US 2019/0131911 A1 May 2, 2019

(30) Foreign Application Priority Data

Oct. 27, 2017 (KR) .......................... 10-2017-0141533

(51) Int. Cl.
*H02P 1/00* (2006.01)
*H02P 29/024* (2016.01)
(Continued)

(52) U.S. Cl.
CPC .......... *H02P 29/024* (2013.01); *B62D 5/0484* (2013.01); *B62D 5/0487* (2013.01);
(Continued)

(58) Field of Classification Search
CPC .. B62D 5/0463; B62D 5/0484; B62D 5/0487; H02P 25/22; H02P 29/024; H02P 29/0241
(Continued)

(56) References Cited

U.S. PATENT DOCUMENTS

| | | | |
|---|---|---|---|
| 2008/0067960 A1* | 3/2008 | Maeda ................... | B62D 5/046 318/400.02 |
| 2011/0077831 A1* | 3/2011 | Nishino ................ | B60T 13/662 701/70 |

(Continued)

FOREIGN PATENT DOCUMENTS

| | | |
|---|---|---|
| JP | 10-14277 | 1/1998 |
| JP | 2013-159165 | 8/2013 |
| JP | 2014-7880 | 1/2014 |

OTHER PUBLICATIONS

Office Action dated Aug. 30, 2018 for Korean Patent Application No. 10-2017-0141533 and its English machine translation by Google translate.

*Primary Examiner* — Eduardo Colon Santana
*Assistant Examiner* — Gabriel Agared
(74) *Attorney, Agent, or Firm* — Ladas & Parry, LLP

(57) ABSTRACT

An apparatus for controlling a multi-winding motor may include: a current detector configured to detect currents of a plurality of windings, each of the windings associated with a corresponding rotor; an abnormal determiner configured to determine abnormality of at least one of the plurality of windings on the basis of the currents of the plurality of windings; a compensation calculation unit configured to calculate a current phase offset and/or compensation current of each of the plurality of windings according to the determined abnormality; and a signal output unit configured to output control signals to control at least one of the plurality of windings according to the current phase offset and/or the compensation current.

20 Claims, 4 Drawing Sheets

(51) Int. Cl.
 *B62D 5/04* (2006.01)
 *H02P 25/22* (2006.01)
(52) U.S. Cl.
 CPC .......... *H02P 25/22* (2013.01); *H02P 29/0241* (2016.02); *B62D 5/0463* (2013.01)
(58) Field of Classification Search
 USPC .......................................................... 318/490
 See application file for complete search history.

(56) References Cited

U.S. PATENT DOCUMENTS

| | | | |
|---|---|---|---|
| 2013/0025273 A1* | 1/2013 | Nozawa | B60T 13/686 60/545 |
| 2014/0265960 A1* | 9/2014 | Sonoda | G01R 31/343 318/400.21 |
| 2017/0036659 A1* | 2/2017 | Murakami | B60T 13/662 |
| 2017/0297616 A1* | 10/2017 | Kikuchi | B62D 5/04 |
| 2018/0131306 A1* | 5/2018 | Suzuki | B62D 5/0487 |
| 2018/0354549 A1* | 12/2018 | Tsubaki | H02P 29/024 |
| 2019/0023315 A1* | 1/2019 | Takizawa | B62D 5/0487 |

* cited by examiner

APPARATUS AND METHOD FOR CONTROLLING MULTI-WINDING MOTOR

CROSS REFERENCE TO RELATED APPLICATION

This application claims priority to Korean Patent Application No. 10-2017-0141533, filed on Oct. 27, 2017, which is hereby incorporated by reference for all purposes as if fully set forth herein.

BACKGROUND

1. Technical Field

Some exemplary embodiments of the present disclosure relate to an apparatus, method, computer program product, and a computer readable medium for controlling a multi-winding motor, and in particular, to an apparatus and a method for controlling current applied to windings of a multi-winding motor and/or a phase offset of the current.

2. Description of Related Art

In general, a DC motor may include a stator comprising a magnet and a rotor with a winding. The winding of the rotor may be connected to an external DC power source through a brush. As the rotor rotates, the polarity of the connection between the brush and the external power source is continuously changed and a direction of a magnetic field generated in the rotor is continuously changed. That is, the magnetic field of the rotor remains in a predetermined polarity relative to a magnetic field of the stator, and thus the motor can generate torque.

The DC motor may be used for an Electronic Power-Steering System (EPS) for providing steering support force for a vehicle. It may need to guarantee reliability of the motor by achieving high power density, high efficiency, and low noise (low vibration). For example, it may need to reduce and attenuate torque ripple, which may be one of the causes of noise and vibration while the motor operates.

It is with respect to these and other general considerations that the following embodiments have been described. Also, although relatively specific problems have been discussed, it should be understood that the embodiments should not be limited to solving the specific problems identified in the background.

SUMMARY

Various exemplary embodiments of the present disclosure may provide an apparatus and a method for controlling a multi-winding motor which can be normally driven by controlling at least one current of at least one winding when at least one of the windings malfunctions.

Some exemplary embodiments of the present disclosure may provide an apparatus and a method for controlling current and/or offset of rotors and/or a motor formed with windings of the rotors, for example, but not limited to, vertically separated rotors having a skew structure.

In accordance with various exemplary embodiments of the present disclosure, an apparatus for controlling a multi-winding motor may comprise: a current detector or current detecting module configured to detect currents of a plurality of windings, each of the plurality of windings associated with a corresponding rotor; an abnormality determiner or abnormality determining module configured to determine abnormality of at least one of the plurality of windings on the basis of the currents of the plurality of windings; a compensation calculation unit configured to calculate a current phase offset and/or compensation current of each of the plurality of windings according to the determined abnormality; and a signal output unit configured to output control signals to control at least one of the plurality of windings according to the current phase offset and/or the compensation current.

In certain exemplary embodiments, the apparatus for controlling the multi-winding motor may further include an abnormality storage unit configured to store abnormality state information of the plurality of windings and store the current phase offset and/or the compensation current calculated based on the abnormality state information.

In accordance with some exemplary embodiments of the present disclosure, a method of controlling a multi-winding motor may comprise detecting currents of a plurality of windings, each of the plurality of windings associated with a corresponding rotor; determining abnormality of at least one of the windings on the basis of the currents of the plurality of windings; calculating a current phase offset and/or compensation current of each of the plurality of windings according to the determined abnormality; and outputting control signals to at least one of the plurality of windings according to the current phase offset and/or the compensation current.

In certain exemplary embodiments, the method of controlling the multi-winding motor may further include storing abnormality state information of the plurality of windings and storing the current phase offset and/or the compensation current calculated based on the abnormality state information.

A motor according to certain exemplary embodiments of the present disclosure may reduce cogging torque or torque ripple.

Further, a motor according to some exemplary embodiments of the present disclosure may maintain desired steering torque even when a winding malfunctions or is in an abnormal state.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
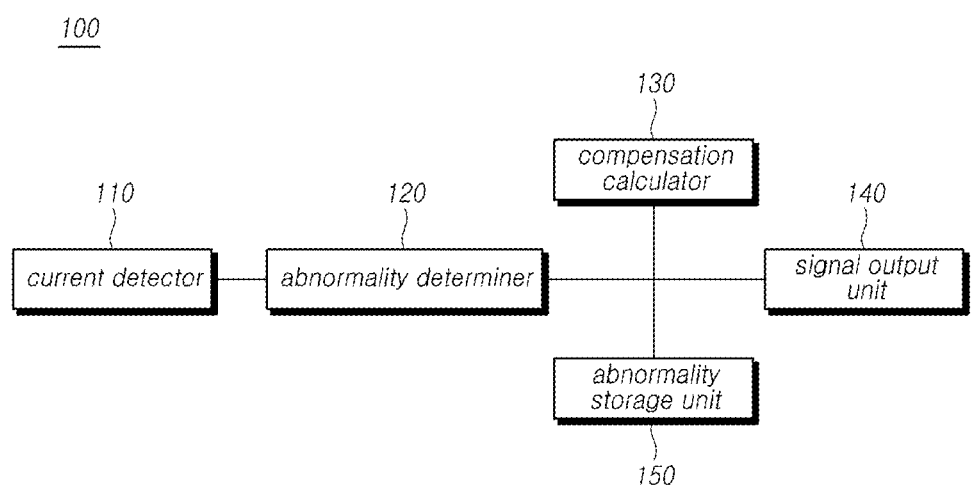
FIG. 1 shows a block diagram of an apparatus for controlling a multi-winding motor according to an embodiment of the present disclosure.

Hereinafter, exemplary embodiments of the present disclosure will be described in detail with reference to the accompanying drawings. The advantages and features of the present disclosure and methods of achieving the same will be apparent by referring to embodiments of the present disclosure as described below in detail in conjunction with the accompanying drawings. However, the present disclosure is not limited to the embodiments described below, but may be implemented in various different forms. The following embodiments are provided only to complete the present disclosure and completely inform those skilled in the art of the scope of the present disclosure, and the present disclosure is defined only by the appended claims. Throughout the present disclosure, the same or like reference numerals designate the same or like elements.

While the terms "first", "second", and the like may modify various elements, components, and/or sections, it will be apparent that such elements, components, and/or sections are not limited by the above terms. The above terms are used merely for the purpose of distinguishing an element, component, or section from other elements, components, or sections. Accordingly, it will be apparent that a first element, a first component, or a first section as mentioned below may be a second element, a second component, or a second section within the technical spirit of the present disclosure.

The terms as used herein are merely for the purpose of describing embodiments and are not intended to limit the present disclosure. As used herein, singular forms are intended to include plural forms unless the context clearly indicates otherwise. The terms "comprises" and/or "comprising" as used herein refer to the existence of a disclosed component, step, operation, and/or element, and do not exclude the existence of or a possibility of addition of one or more other components, steps, operations, and/or elements.

Hereinafter, the present disclosure will be described in more detail with reference to the accompanying drawings.

FIG. 1 shows a block diagram of a multi-winding motor control apparatus or device according to an embodiment of the present disclosure.

Referring to FIG. 1, a multi-winding motor control device 100 (e.g. a dual-winding motor control device) may include one or more of a current detector (or current detecting module) 110, an abnormality determiner (or abnormality determining module, error determiner or error determining module) 120, a compensation calculator (or compensation calculating module) 130, and a signal output unit (or signal outputting module) 140. The current detector 110 may be configured to detect the current(s) of at least one or each of the plurality of windings. Each of the windings may be wound around each corresponding rotor. For example, the plurality of windings may comprise a first winding and a second winding. The first winding is a winding for a first rotor and may be wound around the first rotor, and the second winding is a winding for a second rotor and may be wound around the second rotor. The abnormality or error determiner 120 may be configured to determine abnormality of, or an error(s) in, at least one of the plurality of windings, such as the first winding and the second winding, on the basis of the current values of the windings that is detected by the current detector 110. The terms "abnormality" and "abnormal" may include malfunction, fault, defect and any status which is not normal. The compensation calculator 130 may be configured to calculate a current phase offset and/or compensation current of at least one or each of the plurality of the windings, such as the first winding and the second winding, according to the abnormality or error determined by the abnormality or error determined by the determiner 120. The signal output unit 140 may be configured to output control signals to control at least one of the plurality of windings based on the current phase offset and/or compensation current. For instance, the signal output unit 140 may be configured to output the control signal(s) of the current phase offset and/or the compensation signal to at least one of the first and second windings in response to or according to the calculation result of the compensation calculator 130.

The multi-winding motor control device 100 may further include an abnormality storage unit or memory 150. The abnormality storage unit 150 may be configured to store abnormality state information of the plurality of the windings, for example, the first and second windings, and store the current phase offset and/or the compensation current that have been calculated based on the abnormality state information.

In an exemplary embodiment, the first rotor may be located at an upper part of the motor and include the first winding, and the second rotor may be located at a lower part of the motor and include the second winding. One or both of the first and second rotors may have, for example, but not limited to, a skew structure. Although some exemplary embodiments of present disclosure are described as dual windings type for illustration purposes, those exemplary embodiments may be implemented as multiple windings type, such as triple windings. Further, the first and second rotors may be configured to be skewed at a predetermined angle ($\theta$), and $\theta$ is a skew angle between the first rotor and the second rotor. The predetermined angle($\theta$) can be stored in advance in the vehicle through an experiment or the like.

The current detector 110 may be configured to measure or sense the current applied to at least one or each of the plurality of windings, such as the first winding and the second winding, or to at least one or each of the first rotor and the second rotor. For example, the measurement of the current may be performed by a current sensor which may located within a circuit to measure driving current input into the motor through a bridge circuit.

The term "detect" may include the meaning of the acquisition of corresponding information. The term "detect" may include not only direct detection by the current detector 110 but also acquisition of information detected by an external device.

When at least one of the currents of the plurality of windings, for example, the current of the first winding and the current of the second winding, is smaller than a threshold value, the abnormality determiner 120 may determine that at least one of the plurality of windings, such as at least one of the first winding and/or the second winding, is in an abnormal status. For example, the threshold value may be set as 50% of the total current applied to the first rotor and the second rotor, although it is not required.

Accordingly, in a normal state, in which there is no abnormality in the winding or the abnormality is within a predetermined range, the current of each of the first winding and the second winding may be 50% of the total current, meaning that they are the same as each other. That is, the total current may be evenly distributed and applied to the first winding and the second winding at the same ratio.

The compensation calculator 130 may be configured to calculate the compensation current and/or the current phase offset which may be applied to at least one of the plurality of windings (e.g. the first winding and the second winding) which has been determined to be in the normal state. For instance, the compensation current may be set within the range from 50% to 100% of the total current. That is, in order to compensate for the current of a winding having therein abnormality such as a short, the compensation current having the current value of 50% to 100% of the total current may be applied to the normal winding among the first and second windings. For example, when it is determined that the first winding is in an abnormal status, 100% of the total current may be applied to the second winding. Alternatively, when it is determined that the first winding is in an abnormal status, 80% of the total current may be applied to the second winding.

Further, in order to reduce cogging torque ripple or torque ripple, not only the compensation current but also the current phase offset may be applied to the normal winding among the plurality of windings.

In an exemplary embodiment where the first winding is a winding of the upper rotor, that is, the first rotor, and the second winding is a winding of the lower rotor, that is, the second rotor, if the first winding is normal and the second winding is abnormal, the compensation current may be applied to the first winding and a positive value (+) of the current phase offset may be applied to the first winding.

On the other hand, when the first winding is abnormal and the second winding is normal, the compensation current may be applied to the second winding and a negative value (−) of the current phase offset may be applied to the second winding.

The signal output unit 140 may be configured to generate and output a control signal to input the current phase offset and/or the compensation current into the normal winding among the plurality of windings.

Further, when the first winding or the second winding is in an abnormal status, the abnormal storage unit 150 may extract the current phase offset and/or the compensation current on the basis of stored information without a complex calculation process, generate a control signal to input the extracted current phase offset and/or compensation current into the normal winding among the plurality of windings, and transmit the generated control signal to the signal output unit 140. Alternatively, the signal output unit 140 may be configured to extract the current phase offset and/or the compensation current according to information, stored in the abnormality storage unit 150, and generate a control signal to transmit it to the normal winding among the plurality of windings.

The current detector 110, error determiner 120, compensation calculator 130, signal output unit 140, and abnormality storage unit 150 may be hardware, software or combination of hardware and software. A "module" and/or "unit" may refer to a hardware based module/unit, software based module/unit or a combination of hardware and software. Embodiments of a hardware based module/unit or hardware may include self-contained components such as chipsets, specialized circuitry, processors and one or more memory devices, while a software-based module/or or software may be part of a program code or linked to the program code containing specific programed instructions. A module/unit (whether hardware, software, or a combination thereof), may be designed to implement or execute one or more particular functions or routines.

Figure 2:
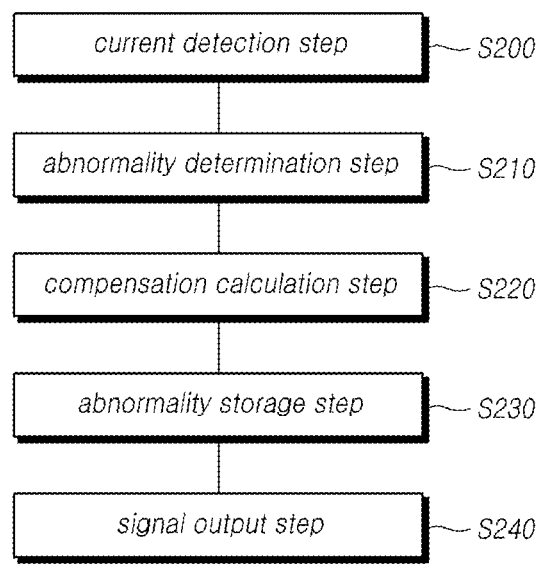
FIG. 2 shows a flowchart of a method of controlling a multi-winding motor according to an embodiment of the present disclosure.

FIG. 2 shows a flowchart of a method of controlling a multi-winding motor according to an embodiment of the present disclosure.

At a current detection step S200, the currents of the plurality of windings may be sensed or detected. In the case of the dual-winding motor, current of each of a first winding, which is a winding of a first rotor, and a second winding, which is a winding of a second rotor, may be sensed or detected.

At an abnormality determination step S210, abnormality of at least one of the plurality of the windings, such as the first winding and the second winding, may be determined on the basis of the currents of the plurality of windings (e.g. the current of the first winding and the current of the second winding) detected at step S210.

At a compensation calculation step S220, a current phase offset and/or compensation current which may be applied to each of the plurality of windings, e.g. the first winding and the second winding, may be calculated according to the abnormality determined at step 210.

At a signal output step S240, one or more control signals associated with the current phase offset and/or the compensation current may be output to at least one of the plurality of windings, such as the first winding and the second winding, according to the calculation result of step 220.

The method of controlling the multi-winding motor according to an exemplary embodiment of the present disclosure may further include an abnormality storage step S230 of storing abnormality state information of the plurality of windings, for example, the first winding and the second winding, and storing the current phase offset and/or the compensation current which have been calculated based on the abnormality state information.

Some exemplary embodiments of each step of the method of controlling the dual-winding motor will be made with reference to FIG. 3.

Figure 3:
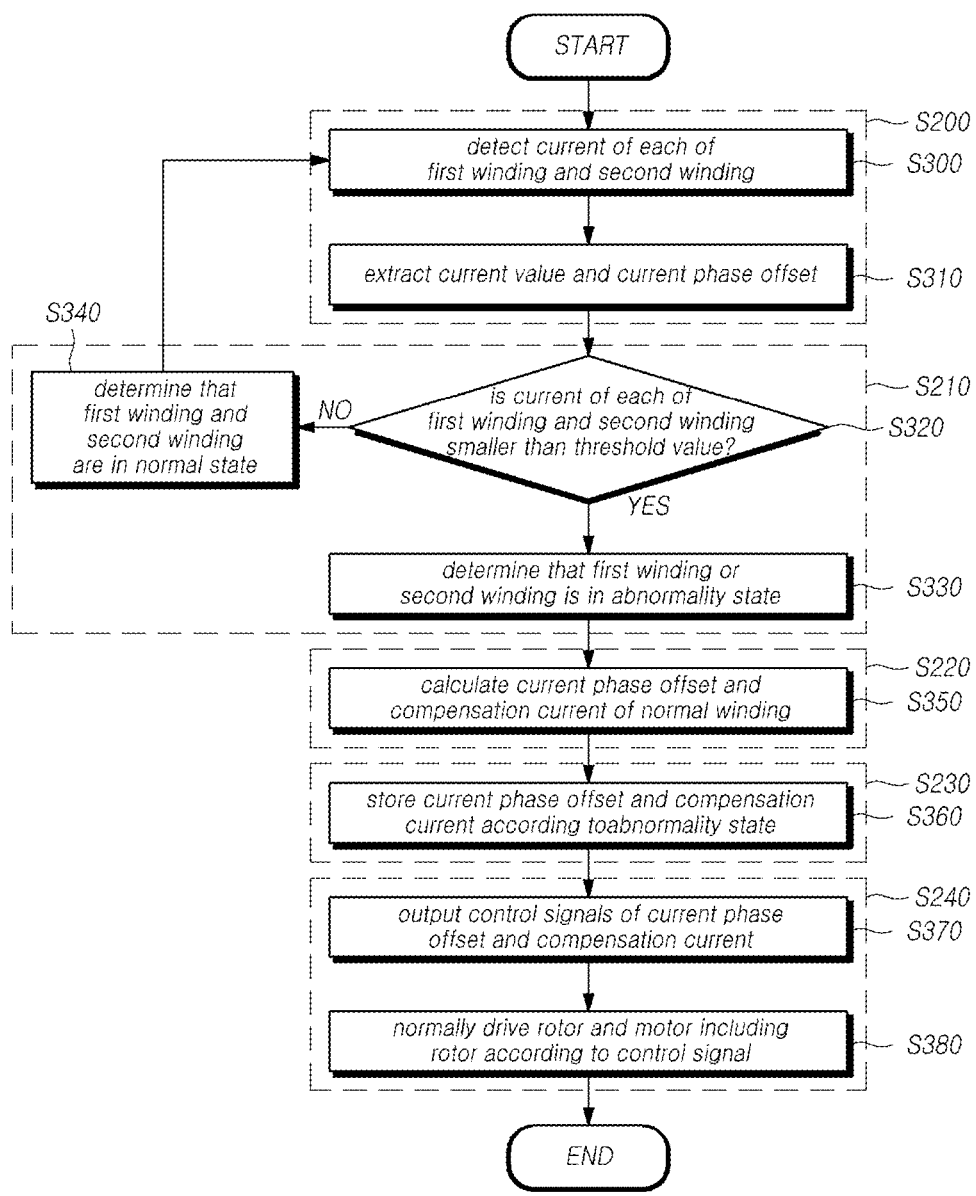
FIG. 3 shows a flowchart of a method of controlling a dual-winding motor according to an exemplary embodiment of the present disclosure.

FIG. 3 shows a flowchart of a method of controlling a dual-winding motor according to an exemplary embodiment of the present disclosure.

The current detection step S200 of FIG. 2 may comprise steps S300 and S310.

In step S300, current of each of the first winding and the second winding is detected, measured or sensed.

In step S310, the current and/or the current phase offset of each of the first winding and the second winding may be extracted on the basis of the detected current.

The abnormality determination step S210 of FIG. 2 may comprise steps S320, S330 and S340.

The step S320 determines whether the current of the first winding or the current of the second winding is smaller than a threshold value.

For example, the threshold value may be 50% of the total current applied to the first rotor and the second rotor, although it is not required.

When the current of at least one of the first winding and the second winding is substantial identical to the threshold value, in step S340, it is determined that the first winding and the second winding are normal, and the process returns to step S300.

On the other hand, when the current of at least one of the first winding and the second winding is smaller than the threshold value, in step S330, it is determined that the first winding or the second winding is in an abnormal status.

For example, when the current of the first winding is smaller than the threshold value and the current of the second winding is substantially identical to the threshold value, it may be determined that the first winding is in the abnormal status and the second winding is in the normal status.

The compensation calculation step S220 of FIG. 2 may comprise step S350 In step S350, the current phase offset value and/or the compensation current of the normal winding, which is determined as in a normal status among the first and second windings, are calculated.

Further, the error storage step S230 of FIG. 2 may comprise step S360. In step S360, abnormal state information of the first winding and the second winding is stored, and the current phase offset and/or the compensation current, which have been calculated based on the abnormal state, are stored.

For example, the current phase offset and/or the compensation current may be extracted on the basis of or from the stored information without a complex calculation process, and a control signal may be generated to input the extracted current phase offset and/or compensation current to the normal winding among the first and second windings.

The signal output step S240 of FIG. 2 may comprise steps S370 and S380. In step S370, the control signals of the current phase offset and/or the compensation current may be output into, for example, but not limited to, current control devices of the first and second rotors.

Then, in step S380, by applying the compensation current and/or the current phase offset to the first winding or the second winding according to the control signal, the motor including the windings may be driven normally.

As described above, a motor according to certain embodiments of the present disclosure may reduce cogging torque or torque ripple and may maintain desired steering torque even when one of windings malfunctions.

Further, an apparatus and a method for controlling a dual-winding motor according to the present disclosure can configure an electronic power-steering system for controlling steering of a vehicle and can be applied to any motor having multiple windings.

Figure 4:
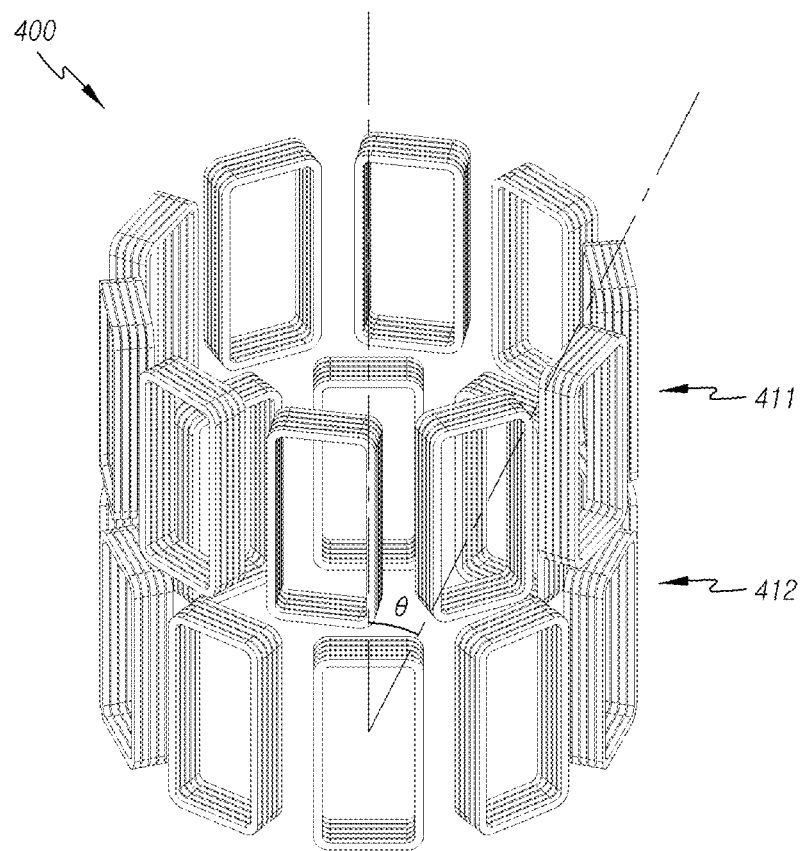
FIG. 4 shows an example of a dual-winding motor according to an exemplary embodiment of the present disclosure.

FIG. 4 shows an example of a dual-winding motor according to an exemplary embodiment of the present disclosure.

In an exemplary embodiment, the first rotor (411) may be located at an upper part of the motor (400) and include the first winding, and the second rotor (412) may be located at a lower part of the motor (400) and include the second winding. One or both of the first and second rotors (411, 412) may have, for example, but not limited to, a skew structure. The motor can be configured with skew structure. The skew angle(θ) can be stored in advance in the vehicle through an experiment or the like.

Even if it was described above that all of the components of an embodiment of the present disclosure are coupled as a single unit or coupled to be operated as a single unit, the present disclosure is not necessarily limited to such an embodiment. That is, at least two elements of all structural elements may be selectively joined and operate without departing from the scope of the present disclosure.

The above embodiments of the present disclosure have been described only for illustrative purposes, and those skilled in the art will appreciate that various modifications and changes may be made thereto without departing from the scope and spirit of the disclosure. The scope of the present disclosure shall be construed on the basis of the accompanying claims in such a manner that all of the technical ideas included within the scope equivalent to the claims belong to the present disclosure.

What is claimed is:

1. An apparatus for controlling a multi-winding motor, the apparatus comprising:
   a current detecting module configured to detect currents of a plurality of windings, each of the windings associated with each corresponding rotor, the plurality of windings comprising a first winding associated with a first rotor and a second winding associated with a second rotor;
   an error determining module configured to determine abnormality of at least one of the plurality of windings based on at least one of the currents of the plurality of windings;
   a compensation calculation unit configured to calculate a current phase offset and/or compensation current of each of the plurality of windings according to the abnormality; and
   a signal output unit configured to output control signals to control at least one of the plurality of windings according to the current phase offset and/or compensation current,
   wherein the compensation calculation unit is configured to:
   when the first winding associated with the first rotor does not have the abnormality, calculate the current phase offset of the first winding associated with the first rotor to be a positive value so that the positive value of the current phase offset is applied to the first winding associated with the first rotor, and
   when the second winding associated with the second rotor does not have the abnormality, calculate the current phase offset of the second winding associated with the second rotor to be a negative value so that the negative value of the current phase offset is applied to the second winding associated with the second rotor.

2. The apparatus of claim 1, further comprising an abnormal storage unit configured to store abnormal state information of the plurality of windings and store the current phase offset and/or the compensation current calculated based on the abnormal state information.

3. The apparatus of claim 1, wherein the first rotor and the second rotor having a skew structure in which the first rotor and the second rotor are vertically separated.

4. The apparatus of claim 3, wherein the first rotor and the second rotor are skewed at a predetermined angle.

5. The apparatus of claim 1, wherein the abnormality determining module is configured to determine that at least one of the plurality of windings has the abnormality when at least one of the currents of the plurality of windings is smaller than a threshold value.

6. The apparatus of claim 5, wherein the threshold value is set as 50% of a total current applied to the first rotor and the second rotor.

7. The apparatus of claim 1, wherein the compensation calculating module is configured to calculate the compensation current and/or the current phase offset to at least one normal winding among the plurality of windings.

8. The apparatus of claim 7, wherein the compensation current is set as 50% to 100% of the total current applied to the first rotor and the second rotor.

9. The apparatus of claim 7, wherein the compensation calculating module is configured to apply a positive value of the current phase offset to the at least one normal winding when the at least one normal winding corresponds to a upper rotor among the first and second rotors, and to apply a negative value of the current phase offset to the at least one normal winding when the at least one normal winding corresponds to a lower rotor among the first and second rotors.

10. A method of controlling a multi-winding motor, the method comprising:
   detecting current of each of a plurality of windings associated with each corresponding rotor, the plurality of windings comprising a first winding associated with a first rotor and a second winding associated with a second rotor;

determining abnormality of at least one of the plurality of windings based on the currents of the plurality of windings;

calculating a current phase offset and/or compensation current of each of the plurality of windings according to the determined abnormality; and outputting control signals to control at least one of the plurality of windings according to the current phase offset and/or compensation current, wherein the calculating of the current phase offset and/or the compensation current comprises:

when the first winding associated with the first rotor does not have the abnormality, calculating the current phase offset of the first winding associated with the first rotor to be a positive value so that the positive value of the current phase offset is applied to the first winding associated with the first rotor, and when the second winding associated with the second rotor does not have the abnormality, calculating the current phase offset of the second winding associated with the second rotor to be a negative value so that the negative value of the current phase offset is applied to the second winding associated with the second rotor.

11. The method of claim 10, further comprising storing abnormality state information of the plurality of windings and storing the current phase offset and/or the compensation current calculated based on the abnormality state information.

12. The method of claim 10, wherein the determining abnormality of at least one of the plurality of windings comprises determining that at least one of the plurality of windings has the abnormality when at least one of the currents of the plurality of windings is smaller than a threshold value.

13. The method of claim 10, wherein the calculating a current phase offset and/or compensation current comprises calculating the compensation current and/or the current phase offset to at least one normal winding among the plurality of windings.

14. The method of claim 13, wherein the calculating a current phase offset and/or compensation current comprises applying the positive value of the current phase offset to the at least one normal winding when the at least one normal winding corresponds to a upper rotor among the first and second rotors, and applying the negative value of the current phase offset to the at least one normal winding when the at least one normal winding corresponds to a lower rotor among the first and second rotors.

15. An apparatus for controlling a multi-winding motor, the apparatus comprising:

memory comprising program instructions stored thereon; and one or more processors operable to executed the program instructions to:

detect currents of a plurality of windings, each of the windings associated with each corresponding rotor, the plurality of windings comprising a first winding associated with a first rotor and a second winding associated with a second rotor;

determine abnormality of at least one of the plurality of windings based on at least one of the currents of the plurality of windings;

calculate a current phase offset and/or compensation current of each of the plurality of windings according to the abnormality; and output control signals to control at least one of the plurality of windings according to the current phase offset and/or compensation current wherein the one or more processors are configured to:

when the first winding associated with the first rotor does not have the abnormality, calculate the current phase offset of the first winding associated with the first rotor to be a positive value so that the positive value of the current phase offset is applied to the first winding associated with the first rotor, and when the second winding associated with the second rotor does not have the abnormality, calculate the current phase offset of the second winding associated with the second rotor to be a negative value so that the negative value of the current phase offset is applied to the second winding associated with the second rotor.

16. The apparatus of claim 15, wherein the memory is configured to store abnormal state information of the plurality of windings and store the current phase offset and/or the compensation current calculated based on the abnormal state information.

17. The apparatus of claim 15, wherein the first rotor and the second rotor have a skew structure in which the first rotor and the second rotor are vertically separated.

18. The apparatus of claim 15, wherein the processor is configured to determine that at least one of the plurality of windings is in an abnormal status when at least one of the currents of the plurality of windings is smaller than a threshold value.

19. The apparatus of claim 18, wherein the threshold value is set as 50% of a total current applied to the first rotor and the second rotor.

20. The apparatus of claim 15, wherein the processor is configured to apply the compensation current and/or the current phase offset to at least one normal winding among the plurality of windings.

* * * * *